Sept. 5, 1933.  J. H. KOHLER  1,926,006
MECHANICAL PACKING RING
Filed Aug. 27, 1929
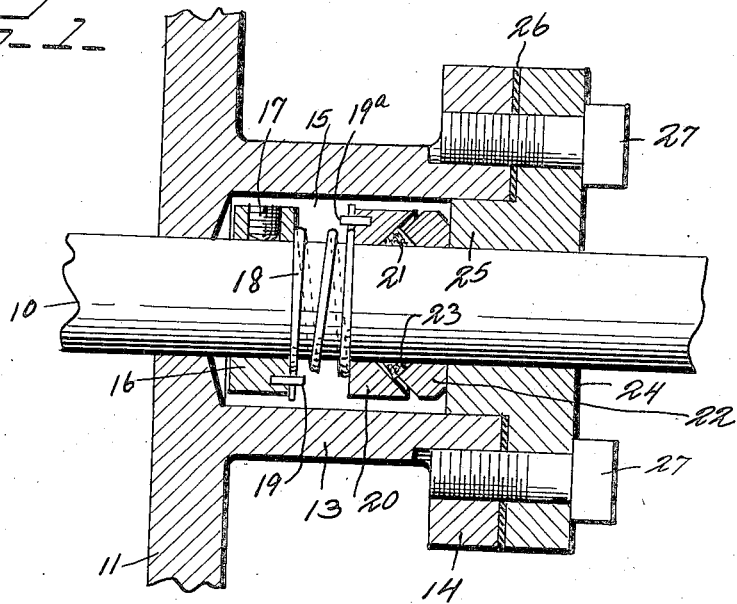
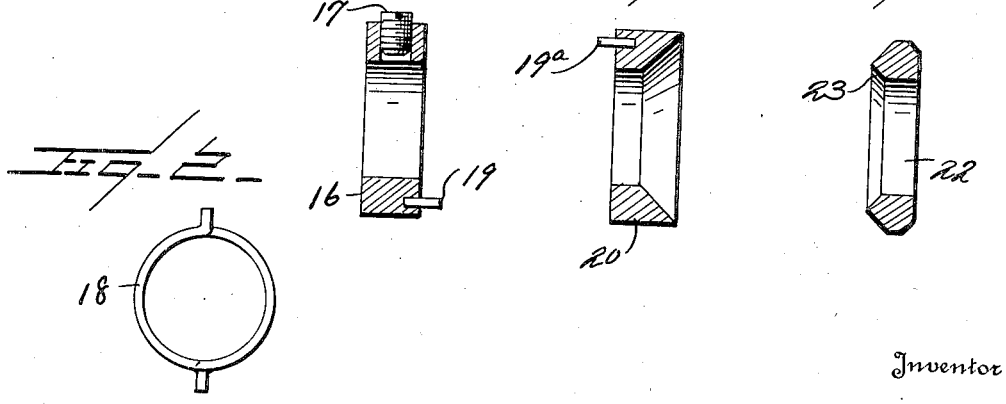
Inventor
J. H. Kohler
By Watson E. Coleman
Attorney Patented Sept. 5, 1933

1,926,006

UNITED STATES PATENT OFFICE 1,926,006

MECHANICAL PACKING RING

Joseph H. Kohler, Hammond, Ind., assignor of one-half to Arthur R. Tuck, Hammond, Ind.

Application August 27, 1929. Serial No. 388,798

1 Claim. (Cl. 286—7)

This invention relates to means for securing a seal around a rotating shaft and the general object of this present invention is to provide a packing means between the shaft and the stuffing box which will take the place of the old style packing, eliminate the cost of more or less constant repacking and which will act to eliminate all danger from leaking, acids, gases, etc.

The general object of the invention is to provide a packing means which will rotate with the shaft to thus cause no wear on the packing and to provide a packing which will keep liquids from leaking along the shaft, the packing being enclosed within a stuffing box so constructed as to keep liquids from leaking out through the stuffing box and through the exterior thereof.

Other objects will appear in the course of the following description.

My invention is illustrated in the accompanying drawing, wherein:—

Figure 1 is a longitudinal sectional view of a packing or seal constructed in accordance with my invention;

Fig. 2 is an end view of the spring;

Figs. 3, 4 and 5 are diagrammatic sections through the collar and packing rings.

Referring to the drawing, 10 designates a shaft which passes through a wall 11 which may be the wall of a chamber, drum, tank or equivalent element containing liquids or gases.

This tank is formed with the annular stuffing box wall 13 which is concentric to the shaft 10 and is formed with a flange 14. The inner face of the stuffing box wall is spaced from the shaft 10.

Disposed within the chamber 15 defined by the stuffing box wall is a collar 16 which is normally held fast upon the shaft for rotation therewith by means of a set screw 17. Bearing against this collar is a compression spring 18, one end of the spring being engaged with the collar 16 by any suitable means, as for instance, by the pin 19. The opposite end of this spring bears against a packing ring 20 whose face remote from the collar is inwardly beveled. Disposed against the beveled face of the ring 20 is a packing 21 of any suitable material and which is triangular in cross section, the exterior diameter of this packing 21 being less than the exterior diameter of the packing ring 20. Coacting with the packing 21 and the packing 20 is a packing ring 22, the inner face of which is beveled inward and toward the packing ring 20 and then inward and away from the packing ring 20 so that this last named portion 23 bears against the inclined outer face of the packing 21 while the upper face of the ring 22 will approximate the upper portion of the inclined face of the ring 20.

The stuffing box 13 is closed by means of a gland 24 having the hub portion 25 fitting between the inner face of the stuffing box and the shaft 10. A gasket 26 is disposed between the inner face of the cap 24 and the flange 14. Screws or bolts 27 pass through the gland 24 and into the flange 14.

In the use of this device, the collar 16 is first placed on the shaft within the stuffing box, the cap 24, of course, being removed for this purpose. Then the tension spring is put in place followed by the male packing ring 20, then five or six turns of "target" packing which is designated 21 is wrapped around the shaft, then the female ring 22 is placed upon the shaft. The assembly is held together at the outside end of of the stuffing box. Then the collar is fastened to the shaft by the set screw 17, then the gland or cap 24 is put in place on the stuffing box with a one-sixteenth inch gasket 25 disposed between the gland and stuffing box. The hub 25 of the gland bears against the packing ring 22 and when the gland is put in place, it presses the tension spring and secures the desired pressure on the packing rings 20 and 22, these packing rings thereby pressing the packing and the inclined faces of the packing rings, forcing the packing tightly against the shaft.

Inasmuch as the collar is secured to the shaft and the spring is engaged with the collar by means of the pin 19 and to the ring 20 by means of the pin 19ª, the whole assembly must rotate with the shaft, thus causing no wear on the packing.

The packing 21 enclosed between the two rings keeps liquids or fluids from leaking along the shaft. The female ring 22 wearing against the face of the gland, makes a seal which keeps fluids from leaking around this ring 22 and so between the shaft and the gland. The gasket 25 between the stuffing box and the gland keeps fluids from leaking out of the stuffing box and so reaching the outside.

Thus I secure a perfect seal which does not wear and which does not require constant repacking. Furthermore, the construction is such that the packing rings will keep constantly adjusted against the packing and adjust the same and thus it will not be necessary to adjust the packing every day or so. This packing device is intended to replace the old style packing and is particularly useful as packing for centrifugal pumps, the use of this packing means actually reducing the cost of manufacturing said pumps. It will be seen that in changing from the ordinary packing such as used on centrifugal pumps to the packing devised by me, it is only necessary to bore out the stuffing box or core the stuffing box out sufficiently to let the packing ring turn around inside of the stuffing box. Any friction or wear will be on the outer face of the ring 22. This will be made of steel and hardened so as to reduce the wear next to nothing, the gland 24 being of cast iron wherein first the rotation of the packing ring 22 against the face of the cast iron gland will cause a seat to be worn on the gland which will be fluid tight. A packing device of this character once placed on the shaft can stay there until the pump wears out or the packing becomes rotten or eaten by acids.

I claim:—

The combination with a stuffing box and a shaft passing therethrough, the stuffing box and shaft being relatively rotatable with relation to each other, the stuffing box being formed to provide a chamber surrounding the shaft, of a gland surrounding the shaft and engaging against the stuffing box and closing one end of the chamber, a collar disposed around the shaft at the opposite end of the chamber and rotatable with the shaft and being freely rotatable within the chamber, a packing ring surrounding the shaft and less in diameter than the interior diameter of said chamber, a spring disposed between said packing ring and the collar and engaged with both the packing ring and the collar against independent rotation, that face of the packing ring confronting the gland being beveled inward and toward the collar, a second packing ring disposed between said gland and the first named packing ring and less in diameter than the interior diameter of the stuffing box whereby it may rotate with the shaft and having a face beveled toward the collar and inward, said face then being beveled inward and toward the gland, packing disposed against the shaft and between the inner portion of the first named packing ring and the inner portion of the second named packing ring and holding said packing rings out of contact with each other, the oppositely beveled faces of the two rings acting to wedge said packing inward toward said shaft, the second named packing ring having a flat face bearing against and rotating with relation to the inner end face of the gland.

JOSEPH H. KOHLER.